United States Patent
Iyatomi et al.

(10) Patent No.: US 6,337,061 B1
(45) Date of Patent: Jan. 8, 2002

(54) METHOD FOR RECLAIMING METAL SULFATE-CONTAINING WASTE SULFURIC ACID

(75) Inventors: Nobuyoshi Iyatomi; Yasuie Mikami, both of Tokyo (JP)

(73) Assignee: Nittetsu Mining Co., Ltd., Tokyo (JP)

( * ) Notice: Subject to any disclaimer, the term of this patent is extended or adjusted under 35 U.S.C. 154(b) by 0 days.

(21) Appl. No.: 08/406,946

(22) PCT Filed: Jul. 22, 1994

(86) PCT No.: PCT/JP94/01212

§ 371 Date: Mar. 28, 1995

§ 102(e) Date: Mar. 28, 1995

(87) PCT Pub. No.: WO95/03994

PCT Pub. Date: Feb. 9, 1995

(30) Foreign Application Priority Data

Jul. 30, 1993 (JP) .................................. 5-190442

(51) Int. Cl.[7] .............................................. C01B 17/90
(52) U.S. Cl. .................... 423/531; 423/70; 423/522; 423/DIG. 2
(58) Field of Search .............. 423/DIG. 2, 531, 423/70, 522

(56) References Cited

U.S. PATENT DOCUMENTS

| | | | | |
|---|---|---|---|---|
| 4,269,809 A | * | 5/1981 | Tolley et al. | ................. 423/70 |
| 4,440,734 A | * | 4/1984 | Kougioumoutzakis | ...... 423/549 |
| 5,015,438 A | * | 5/1991 | Vanderpool et al. | ........ 423/531 |

FOREIGN PATENT DOCUMENTS

| | | | | |
|---|---|---|---|---|
| EP | 0541002 | * | 5/1993 | |
| FR | 0090692 | * | 10/1983 | .................. 423/70 |
| FR | 2632205 | * | 12/1989 | ................. 423/531 |
| JP | 46-5568 | | 2/1971 | |
| JP | 6124538 | * | 12/1986 | ............ 423/DIG. 2 |
| JP | 2-129010 | | 5/1990 | |
| JP | 2-153806 | | 6/1990 | |
| JP | 3-80103 | | 4/1991 | |
| JP | 3-88718 | | 4/1991 | |
| JP | 3100188 | * | 4/1991 | ................. 423/531 |

OTHER PUBLICATIONS

Chemical Abstract 104: 362112; Feb. 1986 vol. 104, No. 6, p. 132.*

(List continued on next page.)

*Primary Examiner*—Steven P. Griffin
*Assistant Examiner*—Timothy C Vanoy
(74) *Attorney, Agent, or Firm*—Jordan And Hamburg LLP

(57) ABSTRACT

For the purpose of efficiently and easily regenerating a sulfuric acid solution having a high concentration and a low impurity content from a metal sulfate-containing waste sulfuric acid solution and waste liquor formed during acid cleaning which are discharged from titanium (IV) oxide-production process carried out according to the sulfuric acid method, titanium present in the metal sulfate-containing waste sulfuric acid solution is removed through a solvent-extraction treatment and then the solution obtained after the solvent-extraction is subjected to a diffusive dialysis treatment.

3 Claims, 1 Drawing Sheet

OTHER PUBLICATIONS

Hydrometallurgy 12—"Iron (III) Removal From Base–Metal Electrolyte Solutions by Solvent Extraction" by G.P. Demopoulos and D.L. Gefvert, pp. 299–315, Dec. 1984.

Fine Particles & Powder Metallurgy, vol. 36, No. 3,—"Production of Highly Pure Iron Oxide Using a Solvent Extraction Method" by Osamu Kimura and Akira Chiba, pp. 267–271, Apr. 1989.

Conservation & Recycling, vol. 10, No. 4,—"Recovery of Ferrous Sulfate and Sulfuric Acid from Spent Pickle Liquor of the Steel Industry" by Jerzy Niecko, pp. 309–314, 1987.

Sulphur No. 207—"Reprocessing spent sulphuric acid" by R. Al Samadi, C.M. Evans and I.M. Smith, pp. 43, 45, 47, 49–50, Mar—Apr. 1990.

Process Ind Can, vol. 71, No. 4,—"Reuse of Waste Ferrous Sulphate" by Pawlowski and M. Kotowski, pp. 521–529, 1987.

Chemical Engineering, vol. 93, No. 3,—"Acid recovery cuts waste output" by I. Smith et al., pp. 44–45, Feb. 3, 1986.

Chemical Engineering, vol. 89, No. 8,—"Process gives new life to contaminated sulfuric acid" by H.R. Kueng and P. Reimann, pp. 72–73, Apr. 19, 1982.

* cited by examiner

METHOD FOR RECLAIMING METAL SULFATE-CONTAINING WASTE SULFURIC ACID

BACKGROUND OF THE INVENTION

The present invention relates to a method for reclaiming waste sulfuric acid discharged from, for instance, a titanium oxide-production process.

The so-called sulfuric acid method has been well-known as a method for preparing titanium oxide (titania) widely used as a coloring material. A large amount of waste sulfuric acid is discharged mainly from the solid/liquid separation step for titanium hydroxide during the titanium oxide-production process. The waste sulfuric acid contains, for instance, Fe, Ti, Cr and V originated from ilmenite and titanium slug as raw materials for titanium.

In the past, the waste sulfuric acid was neutralized and then burried under the ground or dumped at sea in the form of gypsum. However, new techniques for treating the waste sulfuric acid are required because of various problems, for instance, environmental pollution, the cost of insurance for the land in which gypsum is buried and the enormous expenses necessary for the post-treatment of the waste sulfuric acid.

There have been a variety of proposals in response to these problems. For instance, Japanese Un-examined Patent Publication (hereunder referred to as "J.P. KOKAI") Nos. Hei 3-80103 and Hei 3-88718 each discloses a method for removing impurities such as Fe ions, which makes use of a solvent-extraction process. In these methods, however, the strongly acidic sulfuric acid solution per se is directly subjected to a solvent-extraction treatment. Therefore, Fe ions are, in fact, extracted in poor efficiency and the iron-containing component thus recovered also has low purity, in spite of the assertions of the inventors of the foregoing patents. Moreover, in these methods, trivalent iron ions are directly extracted so the use of an acidic extraction agent would require a multistage extraction treatment because of the low extraction rate thereof.

Under such circumstances, the inventors of this invention have developed a method for effectively recovering a highly concentrated sulfuric acid solution and filed a patent application, EP-A1-0541002, in which the aforementioned solvent-extraction method is improved so as to enhance the bivalent iron ion-removing efficiency. However, the sulfuric acid solution thus recovered is dark green because of the presence of residual Cr and V which are converted into colored oxides and it is difficult to reuse the colored sulfuric acid solution in the process for preparing titanium oxide used, in particular, as a white pigment.

Moreover, there has also been proposed a diffusive dialysis method, as a technique for treating the waste sulfuric acid, which makes use of an anion exchange membrane. However, if the waste sulfuric acid is treated through the diffusive dialysis, particles are deposited on the surface of the ion exchange membrane immediately after putting the dialyzer in operation and this leads to deterioration of the quality of the membrane and breakage of the membrane due to deposition of particles within the membrane. For this reason, if the foregoing phenomenon occurs during the operation of the device over a long period of time, the deposits should be removed by washing the anionic exchange membrane with an agent capable of washing them away.

To eliminate the problem of poor efficiency, J.P. KOKAI No. Hei 2-153806 proposes a method for recovering sulfuric acid present in a titanium-containing waste sulfuric acid solution while setting the solution against water in a multi-stage diffusive dialysis tank equipped with an anion exchange membrane wherein the solution and water are countercurrently supplied to the dialysis tank. In other words, the former is passed, through the tank, from the front stage to the rear stage, while the latter is passed therethrough from the rear stage to the front stage.

This method permits the elimination of the step for washing the anion exchange membrane and a decrease in the degree of quality-deterioration of the membrane, but the membrane should be washed every 10 days as is described in Examples of the patent. Therefore, the method should further be improved in its efficiency.

SUMMARY OF THE INVENTION

It is an object of the present invention to solve the foregoing problems and to provide a method for efficiently and easily regenerating a sulfuric acid solution having a high concentration and a low impurity content from metal sulfate-containing waste sulfuric acid and waste liquor formed during acid cleaning which are discharged from the process for preparing titanium (IV) oxide according to the sulfuric acid method.

According to the present invention, the foregoing object can be accomplished by removing titanium present in a metal sulfate-containing waste sulfuric acid solution through a solvent-extraction treatment and then subjecting the solution, from which titanium is extracted, to a diffusive dialysis treatment.

It is preferred to backwardly extract the titanium thus extracted by bringing the organic solvent, which is obtained through the solvent-extraction and contains titanium, into contact with an alkaline solution to thus convert the titanium into an insoluble compound through the backward extraction; to bring the organic solvent obtained after the removal of titanium into contact with the remaining solution obtained after the diffusive dialysis treatment for regenerating the organic solvent through the backward extraction of the alkali ions into the aqueous phase; and to reuse the regenerated organic solvent in the solvent-extraction process for reclaiming the waste sulfuric acid.

Moreover, it is desirable that the waste sulfuric acid solution be optionally filtered while cooling to control the concentration of free sulfuric acid present therein prior to the solvent-extraction of the solution.

The method for reclaiming metal sulfate-containing waste sulfuric acid according to the present invention basically comprises the step of effectively removing principal impurities such as iron, titanium, chromium and vanadium to thus reclaim a solution of highly concentrated sulfuric acid which can be widley reused.

Among these impurities, titanium ions are included in, for instance, the waste sulfuric acid solution discharged from the titanium oxide-production process in an amount ranging from 2 to 10 g/l (these ions are dissolved therein mainly in the form of $TiO-SO_4$ and partially in the form of $Ti_2(SO_4)_3$). Easily hydrolyzable tetravalent titanium ions, among others, can form titanium oxide particles which may cause quality-deterioration and breakage of the ion exchange membrane from deposition thereof on the surface of the ion exchange membrane and within the membrane during the diffusive dialysis treatment. For this reason, removal of these ions is indispensable for industrially applying the diffusive dialysis method to the reclamation of the metal sulfate-containing waste sulfuric acid. The inventors of this invention have found out that the formation of titanium oxide particles on an ion exchange membrane can substantially be inhibited if the titanium content in the solution is, in advance, reduced to a level of not more than 0.5 g/l through solvent-extraction. The titanium components remaining even after the solvent-extraction are mainly composed of trivalent titanium ions which are less hydrolyzable as compared with tetravalent titanium ions. Therefore, the waste solution obtained after the solvent-extraction treatment may directly be subjected to a diffusive dialysis treatment without impairing the intended effect of the method to yield a sulfuric acid solution having a low content of impurities such as chromium and iron. In particular, it is desirable to remove solid contents present in the waste solution obtained after the solvent-extraction through micro filtration prior to the diffusive dialysis thereof. Moreover, if the organic solvent still remains in the waste solution, it is desirable to remove the remaining organic solvent by bringing the waste solution into contact with, for instance, activated carbon.

If the method of the present invention is used for reclaiming waste sulfuric acid, the method can be carried out according to the batchwise process in which a complete waste solution as a waste acid solution is treated. The method can also be used in or the so-called continuous recovery process which comprises the steps of continuously withdrawing a waste sulfuric acid solution from, for instance, a titanium oxide-production process, recovering the acid and simultaneously separating and removing metal salts separated from the solution. The continuous recovery process is generally preferred, since the organic solvent used in the solvent-extraction treatment can be regenerated by removing titanium components through backward extraction with an alkali solution.

The extraction of titanium ions is carried out using, for instance, an acidic organophosphoric acid compound, a carboxylic acid, a sulfonic acid or hydroxy oxime, as has been well-known in the art. Among the acidic organophosphoric acid compounds, acidic phosphoric acid diesters are particularly preferred.

Titanium ions extracted with, for instance, an acidic organophosphoric acid compound, are backwardly extracted with, for instance, an alkali solution such as an ammonium carbonate solution and recovered in the form of, for instance, hydroxide. The titanium compound can be fired to give titanium oxide after the recovery thereof. The product can be used as a raw material for titanium.

Ferrous sulfate can be crystallized and the sulfuric acid concentration of the waste solution can be controlled to a level favorable for the diffusive dialysis treatment by filtering the waste sulfuric acid solution while cooling prior to the solvent- extraction treatment thereof.

In the method of the present invention, titanium components present in the metal sulfate-containing waste sulfuric acid solution are removed through the solvent-extraction treatment prior to diffusive dialysis treatment of the waste solution. Thus, the waste sulfuric acid solution can quite efficiently and easily be reclaimed to yield a sulfuric acid solution having a low content of impurities such as iron. In contrast the conventional diffusive dialysis method is inefficient. Moreover, the diffusive dialysis method permits the removal of components such as chromium and vanadium which cannot be removed by the solvent-extraction method. The removal of such components is quite beneficial from the viewpoint of environmental sanitation.

In particular, the method of the present invention has great industrial value. This is because the method permits effective recovery of sulfuric acid from a metal sulfate-containing waste sulfuric acid solution in a closed system and the reuse thereof and also permits the prevention of any environmental pollution by bringing an organic solvent, containing extracted titanium and obtained through a solvent-extraction treatment, into contact with an equal amount of an alkali solution to thus backwardly extract titanium and to convert it into an insoluble compound: bringing the organic solvent obtained after the titanium extraction into contact with the liquid remaining after the dialysis formed during a diffusive dialysis treatment to thus regenerate the organic solvent through backward extraction of alkali ions into the aqueous phase; and using the regenerated organic solvent in the solvent-extraction process for reclaiming the waste sulfuric acid solution. In addition, titanium, scandium or the like can be recovered as by-products and, therefore, the method of the present invention is likewise quite beneficial from the viewpoint of effective use of resources.

If the waste sulfuric acid solution is filtered while cooling prior to the solvent-extraction, iron sulfate can easily be obtained as well.

DETAILED DESCRIPTION OF PREFERRED EMBODIMENTS

Figure 1:
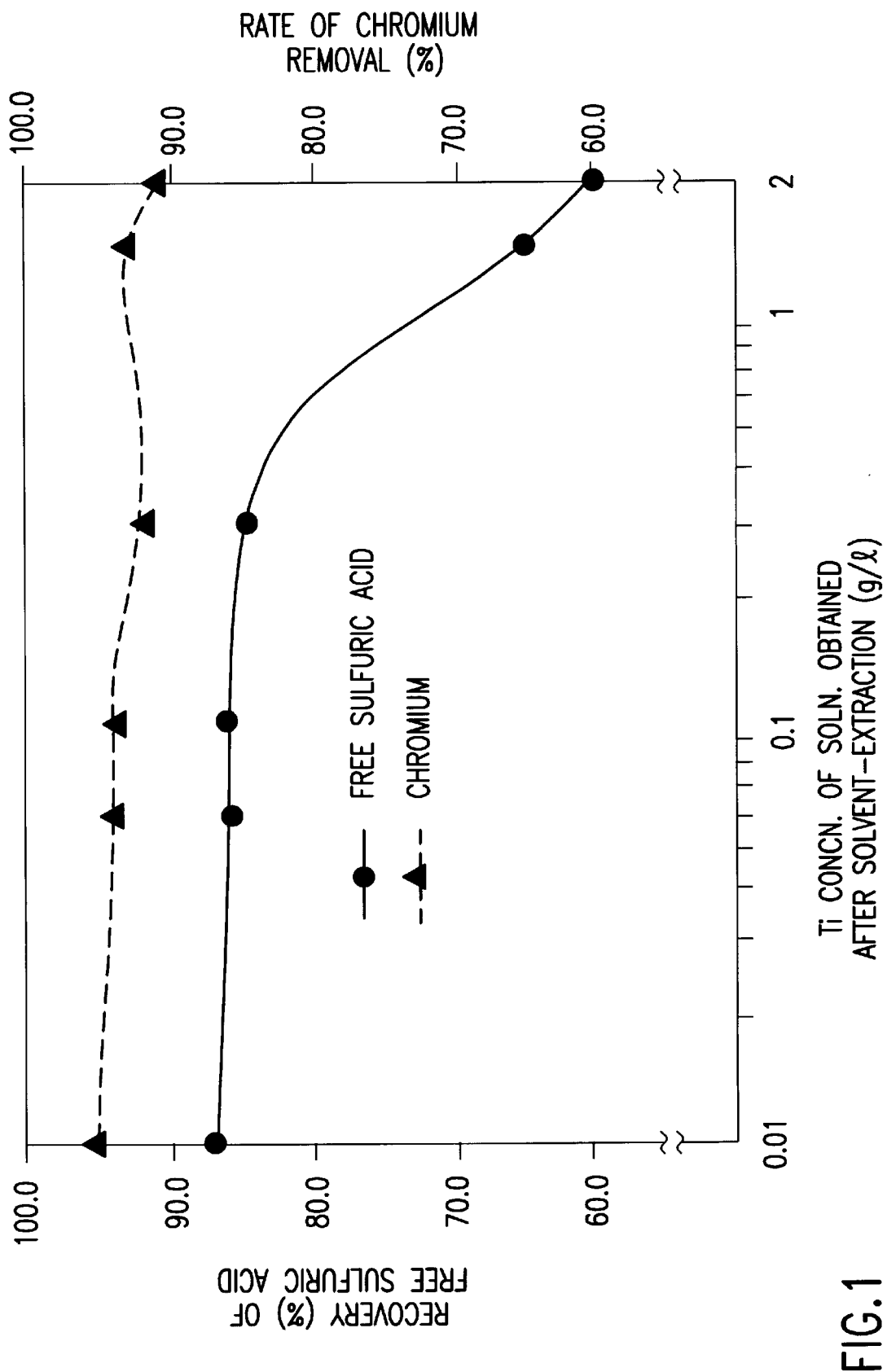
FIG. 1 is a graph showing the relation between the titanium concentration of the solution obtained by the solvent-extraction treatment and the recovery of free sulfuric acid or the rate of chromium removal observed during the diffusive dialysis treatment.

Examples of the present invention will hereunder be described, but the present invention is not restricted to these specific Examples.

EXAMPLE 1

An amount of 10 l of a waste sulfuric acid solution discharged from a titanium oxide-production process carried out according to the sulfuric acid method which had an Fe content of 30 g/l (as expressed in terms of the amount of bivalent and trivalent iron ions), a Ti content of 2 g/l (titanium ions), a Cr content of 0.1 g/l (chromium ions), a V content of 0.15 g/l (vanadium ions), an Sc content of 14 mg/l (scandium ions) and a sulfate content of 310 g/l (sulfate ions) was brought into contact with 10 l of 1 mol/l solution of di-2-ethylhexylphosphoric acid in kerosine over 20 minutes to thus extract titanium ions and scandium ions present in the aqueous phase into the organic phase. The solvent-extraction treatment gave 10 l of a solvent-extracted solution which had an Fe content of 30 g/l (iron ions), a Ti content of 0.01 g/l (titanium ions), a Cr content of 0.1 g/l (chromium ions), a V content of 0.15 g/l (vanadium ions), an Sc content of not more than 1 mg/l (scandium ions) and a sulfate content of 310 g/l (sulfate ions). The rate of recovery and removal of titanium and scandium was found to be 99%.

Then the solution thus treated was supplied to a dialysis chamber of a diffusive dialysis device at a flow rate of 240 ml/hr at room temperature, while water was supplied to a recovery chamber of the device separated from the dialysis chamber by an anion exchange membrane at a flow rate of 150 ml/hr. The solution and water were circulated through each corresponding chamber over 20 hours. As a result, 2.98 l of a recovered solution had an Fe content of 2.1 g/l (as expressed in terms of the amount of Fe ions), a Ti content of not more than 0.001 g/l (Ti ions), a Cr content of 0.006 g/l (Cr ions), a V content of 0.014 g/l (V ions) and a sulfate content of 305 g/l (sulfate ions) and 4.6 l of a solution remaining after the dialysis which had an Fe content of 29.8 g/l (Fe ions), a Ti content of 0.01 g/l (Ti ions), a Cr content of 0.1 g/l (Cr ions), a V content of 0.147 g/l (V ions) and a sulfate content of 125.8 g/l (sulfate ions). The recovery of free sulfuric acid, the rate of chromium removal and the rate of vanadium removal were 70%, 96% and 94%, respectively.

Moreover, 10 l of the organic phase recovered through the foregoing solvent-extraction treatment was brought into contact with an aqueous phase comprising 0.2 mol/l of ammonium carbonate aqueous solution and 2 mol/l of aqueous ammonia over 20 minutes, then precipitates formed in the organic phase were filtered off and dried to thus give 58.6 g of a mixture comprising titanium and scandium (having a Ti content of 32.4% and an Sc content of 0.18%). The recoveries of Ti and Sc were found to be 95% and 75%, respectively.

The foregoing organic solvent (12 l) whose volume was changed through the backward extraction was brought into contact with the same volume of the solution remaining after the diffusive dialysis treatment over 20 minutes to backwardly extract the alkali ions present in the organic phase into the aqueous phase and to thus yield 10 l of the organic solvent. The organic solvent thus recovered was again brought into contact with a waste sulfuric acid solution discharged during a titanium oxide-production process and as a result, it was found that the recoveries of titanium and scandium reached 99%.

EXAMPLE 2

An amount of 10 l of a waste sulfuric acid solution discharged from a titanium oxide-production process carried out according to the sulfuric acid method which had an Fe content of 36.5 g/l (as expressed in terms of the amount of bivalent and trivalent iron ions), a Ti content of 3 g/l (titanium ions), a Cr content of 0.2 g/l (chromium ions), a V content of 0.6 g/l (vanadium ions), an Sc content of 20 mg/l (scandium ions) and a sulfate content of 370 g/l (sulfate ions) was cooled to 0° C. to give 960 g of $FeSO_4.7H_2O$ (having an Fe content of 18.8%, a Ti content of 0.04%, a Cr content of 0.002%, a V content of 0.002% and a sulfate ion content of 33.9%).

After crystallizing $FeSO_4.7H_2O$ through the cooling treatment, the waste solution was filtered and 9.5 l of the resulting filtrate which had an Fe content of 19.4 g/l (iron ions), a Ti content of 3.1 g/l (titanium ions), a Cr content of 0.2 g/l (chromium ions), a V content of 0.6 g/l (vanadium ions), an Sc content of 20 mg/l (scandium ions) and a sulfate content of 355 g/l (sulfate ions) was brought into contact with 9.5 l of 1 mol/l solution of di-2-ethylhexylphosphoric acid in kerosine over 20 minutes to thus extract titanium ions and scandium ions present in the aqueous phase into the organic phase. The solvent-extraction treatment gave 9.5 l of a solvent-extracted solution which had an Fe content of 19.4 g/l (iron ions), a Ti content of 0.01 g/l (titanium ions), a Cr content of 0.2 g/l (chromium ions), a V content of 0.6 g/l (vanadium ions), an Sc content of not more than 1 mg/l (scandium ions) and a sulfate content of 355 g/l (sulfate ions). The rate of recovery or removal of titanium, scandium was found to be 99%.

Then the solution thus treated was supplied to a dialysis chamber of a diffusive dialysis device at a flow rate of 230 ml/hr at ordinary temperature, while water was supplied to a recovery chamber of the device separated from the dialysis chamber by an anion exchange membrane at a flow rate of 250 ml/hr to thus circulate the solution and water through each corresponding chamber over 20 hours. As a result, there were recovered 2.45 l of a recovered liquid which had an Fe content of 1.8 g/l (as expressed in terms of the amount of Fe ions), a Ti content of 0.001 g/l (Ti ions), a Cr content of 0.01 g/l (Cr ions), a V content of 0.05 g/l (V ions) and a sulfate content of 246 g/l (sulfate ions) and 2.37 l of a solution remaining after the dialysis which had an Fe content of 16.9 g/l (Fe ions), a Ti content of 0.008 g/l (Ti ions), a Cr content of 0.18 g/l (Cr ions), a V content of 0.53 g/l (V ions) and a sulfate content of 90.2 g/l (sulfate ions). The recovery of free sulfuric acid, the rate of chromium removal and the rate of vanadium removal were found to be 80%, 92% and 91%, respectively.

Moreover, 9.5 l of the organic phase recovered through the foregoing solvent-extraction treatment was brought into contact with an aqueous phase comprising 0.2 mol/l of ammonium carbonate aqueous solution and 2 mol/l of aqueous ammonia over 20 minutes to backwardly extract titanium ions and scandium ions present in the organic phase into the aqueous phase in the form of hydroxides. After allowing the aqueous phase to stand for 20 minutes, the precipitates formed therein were filtered off and dried to thus give 85.8 g of a mixture comprising titanium and scandium (having a Ti content of 33.2% and an Sc content of 0.2%). The recoveries of Ti and Sc were found to be 95% and 85%, respectively.

The foregoing organic solvent (11.4 l) whose volume was changed through the backward extraction was brought into contact with the same volume of the solution remaining after the diffusive dialysis treatment over 20 minutes to backwardly extract the alkali ions present in the organic phase into the aqueous phase and to thus give 9.5 l of the organic solvent. The organic solvent thus recovered was again brought into contact with a waste sulfuric acid solution discharged during a titanium oxide-production process and as a result, it was found that the recoveries of titanium and scandium reached 99%.

EXAMPLE 3

A waste sulfuric acid solution discharged from a titanium oxide-production process performed according to the sulfuric acid method which had an Fe content of 30 g/l (as expressed in terms of the amount of bivalent and trivalent Fe ions), a Ti content of 2 g/l (Ti ions), a Cr content of 0.2 g/l (Cr ions) and a sulfate content of 300 g/l (sulfate ions) was continuously brought into contact with an organic solvent comprising a solution of di-2-ethylhexylphosphoric acid (D2EHPA) in kerosine, whose concentration was variously changed, under the same conditions used in Example 1, over 30 days. Table 1 given below shows titanium concentrations of the solutions obtained through the foregoing solvent-extraction treatment.

TABLE 1

| D2EHPA Concn. of the Organic Solv. Brought into Contact With the Waste Solution (mol/l) | Ti Concn. of the Solution Treated (g/l) |
| --- | --- |
| 2 | 0.01 |
| 1.5 | 0.06 |
| 1 | 0.1 |
| 0..5 | 0.3 |
| 0.1 | 1.4 |
| untreated | 2 |

FIG. 1 shows the results observed when the foregoing solution obtained after the solvent-extraction was subjected to the diffusive dialysis treatment. These results indicate that sulfuric acid can efficiently be recovered from waste sulfuric acid solutions by the diffusive dialysis treatment if the titanium concentration of the waste solution is reduced to a level of not more than 0.5 g/l. Moreover, it can also be confirmed that the diffusive dialysis treatment permits the effective removal of chromium.

What is claimed is:

1. A method for reclaiming a metal sulfate-containing waste sulfuric acid solution comprising the steps of extracting titanium ions from the waste sulfuric acid solution by contacting the waste sulfuric acid solution with an organic solvent effective for extracting titanium ions from the waste sulfuric acid solution; subjecting the waste sulfuric acid solution obtained after the step of extracting to a diffusive dialysis treatment; extracting titanium ions from the organic solvent used in the titanium-extraction by contacting the organic solvent with an alkali solution to extract the titanium and to convert it into an insoluble compound; and bringing the organic solvent obtained after extracting titanium therefrom into contact with the aqueous solution resulting from the diffusive dialysis treatment to extract the alkali ions from the organic solvent into the aqueous phase to regenerate the organic solvent.

2. The method for reclaiming a waste sulfuric acid solution as in claim 1 wherein the organic solvent is selected from the group consisting of an acidic organophosphoric acid compound, a carboxylic acid, a sulfonic acid and a hydroxy oxime.

3. The method for reclaiming a waste sulfuric acid solution as set forth in claim 1 further comprising contacting the waste sulfuric acid solution with the regenerated organic solvent in the step of extracting titanium ions from the waste sulfuric acid solution.

* * * * *